United States Patent
Aridome (10) Patent No.: US 7,492,129 B2
(45) Date of Patent: Feb. 17, 2009

(54) TEMPERATURE ABNORMALITY DETECTING APPARATUS AND METHOD FOR SECONDARY BATTERY

(75) Inventor: Koji Aridome, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 333 days.

(21) Appl. No.: 10/864,510

(22) Filed: Jun. 10, 2004

(65) Prior Publication Data

US 2004/0257089 A1 Dec. 23, 2004

(30) Foreign Application Priority Data

Jun. 20, 2003 (JP) ............................. 2003-176757

(51) Int. Cl.
*H02J 7/00* (2006.01)
*H02J 7/04* (2006.01)
(52) U.S. Cl. ...................... 320/150; 320/153
(58) Field of Classification Search .................. 320/150
See application file for complete search history.

(56) References Cited

U.S. PATENT DOCUMENTS 5,982,152 A * 11/1999 Watanabe et al. ........... 320/150
6,809,502 B2 * 10/2004 Tsujii et al. ................. 320/150
2003/0087148 A1 * 5/2003 Minamiura .................. 429/62

FOREIGN PATENT DOCUMENTS

JP    A 11-178231    7/1999
JP    A 2001-313092   11/2001

* cited by examiner

*Primary Examiner*—Edward Tso
*Assistant Examiner*—Alexis Boateng
(74) *Attorney, Agent, or Firm*—Kenyon & Kenyon LLP

(57) ABSTRACT

A battery ECU includes i) a circuit connected to a plurality of battery temperature sensors provided on a plurality of battery cells which make up a battery, and a cooling fan, the circuit detecting operation of the cooling fan, and ii) a circuit that determines that there is a temperature abnormality in a battery based on the difference between a maximum value and a minimum value of battery temperatures measured by the battery temperature sensors only when the period of time during which temperature increases within a predetermined period of time in the battery temperatures measured by the battery temperature sensors continue to be less than a threshold value is longer than a predetermined period of time, and the cooling fan has been operating for a longer period of time than a suitable cooling fan operating time obtained based on the difference between the maximum value and the minimum value of the measured battery temperatures.

10 Claims, 3 Drawing Sheets

TEMPERATURE ABNORMALITY DETECTING APPARATUS AND METHOD FOR SECONDARY BATTERY

INCORPORATION BY REFERENCE

The disclosure of Japanese Patent Application No. 2003-176757 filed on Jun. 20, 2003, including the specification, drawings and abstract is incorporated herein by reference in its entirety.

BACKGROUND OF THE INVENTION

1. Field of the Invention

The invention generally relates to a secondary battery in which a plurality of battery cells are connected together in series. More particularly, the invention relates to a temperature abnormality detecting apparatus and method for a secondary battery mounted in a vehicle.

2. Description of the Related Art

Secondary batteries are typically used in vehicles that are driven either partially or entirely by an electric motor, such as electric vehicles, hybrid vehicles, and fuel cell vehicles. Electric vehicles are driven by an electric motor which runs using power stored in the secondary battery. Hybrid vehicles can be driven either by an electric motor which runs using power stored in the secondary battery, or by an engine, using the electric motor for additional power when necessary. Fuel cell vehicles can be driven by an electric motor which runs using power generated by a fuel cell, or by an electric motor which runs using power stored in a secondary battery as well as power generated by a fuel cell.

Because these secondary batteries require high-voltage and a great deal of power, a battery pack is used which is formed, for example, by connecting together in series approximately 30 battery modules, each of which has approximately six 1.2V or so nickel metal hydride battery cells connected to one another in series. This means that this kind of secondary battery would then ultimately have 180 (or 200 or more) battery cells connected in series.

While such secondary batteries are not mounted in vehicles that use only an internal combustion engine as the drive power source, they are essential for vehicles such as electric vehicles and hybrid vehicles. Further, while there was little need to consider cooling for lead batteries used to power auxiliary components (such as lights and audio systems) in vehicles, the cooling of these secondary batteries must be given due consideration.

In particular, it is necessary to detect the temperature of the secondary battery and cool it if necessary in order to inhibit problems from occurring, such as deterioration of the secondary battery due to high temperatures. As described above, however, the battery pack is formed of many battery cells connected together in series. Further, the battery temperature is detected for each battery cell. As a result, the battery temperatures of the battery cells may vary. For example, when the temperature of the secondary battery rises do to charging or discharging and cooling air is blown into the battery pack by a cooling fan, heat exchange with the battery cells located farther away from the cooling fan is done using the air that has already been used in the heat exchange with the battery cells that are closer to the cooling fan. Moreover, the area of each battery cell that comes into contact with the cooling air is not necessarily the same.

This is due to such factors as the arrangement of the battery cells in the battery pack, the placement of the cooling fan, and the location of the outside heat source. No matter what the cause, because the battery pack that is made up from multiple battery cells can not be cooled evenly, it is difficult to detect a temperature abnormality in the battery from the detected battery pack temperature (i.e., the temperatures of the plurality of battery cells). Technology related to the cooling of this kind of secondary battery is disclosed in the following publications.

Japanese Patent Application Laid-open No. JP-A-11-178231 discloses a temperature control device for a battery pack in an electric vehicle, which improves safety and usability of a high-voltage battery pack by precisely controlling the temperature of the battery pack. This temperature control device is provided with multiple battery temperature sensors inside a battery pack in which multiple battery cells connected together in series and/or in parallel are housed in a common case. The temperature control device is also provided with a signal processing portion which processes output signals from each of the battery temperature sensors. This signal processing portion has two circuits. One circuit determines that a signal from a battery temperature sensor having a low temperature resistance value is abnormal, and therefore allows the battery to charge or discharge, when only one of the battery temperature sensors has a low temperature resistance value that corresponds to a temperature that is lower, by a predetermined temperature or more, than the temperatures to which the low temperature resistance values of the rest of the battery temperature sensors correspond. The other circuit determines that the battery temperature is abnormal, and therefore prohibits the battery from charging or discharging, when some of the battery temperature sensors have high temperature resistance values that correspond to temperatures that are higher, by a predetermined temperature or more, than the temperatures to which the high temperature resistance values of the majority of the battery temperature sensors correspond.

Thus, when only one of the battery temperature sensors has a low temperature resistance value that corresponds to a temperature that is lower than the temperatures to which the low temperature resistance values of the rest of the battery temperature sensors correspond by a predetermined temperature or more, the temperature control device determines that there is an abnormality in the sensor, not the battery, so the output from that sensor is ignored and the battery is allowed to charge and discharge. That is, if only one of the battery temperature sensors inside the same battery case indicates a low temperature, no problems will be caused by the battery continuing to charge or discharge. Also, when some of the battery temperature sensors have high temperature resistance values that correspond to temperatures that are higher, by a predetermined temperature or more, than the temperatures to which the high temperature resistance values of the majority of the battery temperature sensors correspond, the temperature control device determines that the battery temperature is abnormal, and therefore prohibits the battery from charging or discharging. Ultimately, in a case when the temperature of each portion of the battery within the battery case is monitored using separate sensors, the temperature of part of the battery is actually abnormally high when the temperatures indicated by some of the sensors are higher than the temperatures indicated by the majority of the sensors. Against of this case, it is not necessary to prohibit the battery from charging or discharging when there is any other variance in temperature. Accordingly, this kind of temperature control enables unnecessary prohibiting of charging and discharging to be avoided.

Japanese Patent Application Laid-open No. JP-A-2001-313092 discloses a cooling device which brings a secondary battery into a suitable temperature range and detects an abnormality in a cooling device of the secondary battery. This cooling device includes two circuits. One circuit inhibits an abnormal increase in the temperature of the secondary battery by driving a fan for cooling in Hi mode when a difference $\Delta T$ between an actual battery temperature Tb and an estimated temperature Te calculated from a charge-discharge current of the secondary battery and the cooling capability is greater than a threshold value Tr. The other circuit determines that some sort of abnormality has occurred with the cooling function of the device and outputs a signal indicative of an abnormality when the difference $\Delta T$ remains greater than the threshold value Tr after the cooling fan has been driven in the Hi mode for a predetermined period of time.

This cooling device both enables an abnormal temperature increase in the secondary battery to be suppressed, as well as enables an abnormality with the cooling function of the device to be detected more appropriately.

The temperature control device disclosed in Japanese Patent Application Laid-open No. JP-A-11-178231, however, may inappropriately detect a temperature abnormality when there is a difference in the cooling efficiency resulting from a difference in the location of the battery cells (i.e., due to, for example, the positional relationship between the battery cells in the battery pack and the cooling fan) even if the battery itself is functioning normally. That is, the temperature control device determines that the battery temperature is abnormal even when a variance in the battery temperature occurs due to the location of the battery cells.

Also, the cooling device disclosed in Japanese Patent Application Laid-open No. JP-A-2001-313092 requires that the capability of the cooling fan at each of three levels (Lo, Me, Hi) be grasped in advance in order to detect an abnormality in the cooling device. Further, an abnormality in the cooling device is only able to be detected when the cooling fan is in one of these three modes (i.e., levels or stages). With this cooling device it is difficult to determine an abnormality when the operating state of the cooling fan is being changed continuously (e.g., when the operating voltage is being changed continuously) instead of in stages. In particular, this cooling device requires that coefficients be set beforehand to calculate the estimated temperature. Setting these coefficients is difficult, however, because they differ with each vehicle and each battery.

SUMMARY OF THE INVENTION

In view of the foregoing problems, this invention thus provides an abnormality detecting apparatus and method for a secondary battery, which has a simple structure and is able to accurately detect a temperature abnormality in a secondary battery having a cooling device.

A first aspect of the invention relates to a temperature abnormality detecting apparatus that detects a temperature abnormality in a secondary battery made up of a plurality of battery cells. The temperature abnormality detecting apparatus is provided with i) a measuring device that measures temperatures of at least two battery cells from among the plurality of battery cells, ii) a temperature equalizing device that equalizes the temperatures of the plurality of battery cells, and iii) a first detector that detects a temperature abnormality in the secondary battery based on the temperatures of the battery cells measured by the measuring device, corresponding to operation of the temperature equalizing.

According to this aspect of the invention, the temperature equalizing device cools the battery cells so as to equalize their temperatures by blowing cooling air into a case of the secondary battery, for example. In this state, i.e., while the temperature equalizing device is operating sufficiently, the first detector detects a temperature abnormality in the secondary battery based on the temperature of the battery cells measured by the measuring devices. If at this time the difference between the measured temperatures of two or more battery cells is greater than a predetermined value, for example, a temperature abnormality in the secondary battery is detected. Accordingly, the first detector only makes a determination regarding a temperature abnormality in the secondary battery when the temperatures of the battery cells have been sufficiently equalized. Accordingly, it is possible to avoid an abnormality from being detected due to a difference in the cooling efficiency of the battery cells due to, for example, the positional relationship between the battery cells and the cooling fan. It is also possible to avoid an abnormality from being detected due to an increased temperature difference when the cooling fan is not operating. As a result, an abnormality in the temperature of a secondary battery having a cooling device can be accurately detected by an apparatus having a simple structure.

The temperature abnormality detecting apparatus in the first aspect of the invention, the temperature equalizing device may equalize the temperatures of the plurality of battery cells by cooling the plurality of battery cells by supplying a cooling medium thereto, and the temperature abnormality detecting apparatus may further be provided with a determining device that determines whether the secondary battery has been sufficiently cooled by the cooling medium, wherein the first detector detects whether there is a temperature abnormality in the secondary battery when it is determined by the determining device that the secondary battery has been sufficiently cooled. Accordingly, the first detector only makes a determination regarding a temperature abnormality in the secondary battery when the secondary battery has been sufficiently cooled by the cooling medium and the temperatures of the battery cells have been equalized. As a result, it is possible to detect a temperature abnormality in the secondary battery based on, for example, a temperature difference between battery cells when the determining device has determined that the secondary battery has been sufficiently cooled. It is also possible to avoid an abnormality from being detected 1) due to a difference in the cooling efficiency of the battery cells resulting from, for example, the positional relationship between the battery cells and the cooling fan, or 2) due to an increased temperature difference when the cooling fan is not operating.

The temperature abnormality detecting apparatus according to the first aspect of the determining device may be include a calculating device which calculates a cooling time to sufficiently cool the secondary battery based on a temperature difference between the temperatures of the battery cells measured by the measuring devices, and a pre-stored relationship between the temperature difference and the cooling time, and a second detector that detects an operating time of the temperature equalizing device, and wherein the determining device determines whether the secondary battery is sufficiently cool based on the calculated cooling time and the detected operating time. With this design, the relationship between the temperature difference and the cooling time is stored beforehand using the fact that the cooling time tends to increase the smaller the temperature difference. The cooling time to sufficiently cool the secondary battery is calculated from the difference between the measured temperatures of the battery cells. When the secondary battery is cooled for a duration equal to, or longer than, this cooling time, the temperatures of the battery cells should be equal. In this state, a temperature abnormality in the secondary battery is able to be detected when the difference between the temperatures of the battery cells is large.

The temperature abnormality detecting apparatus according to the first aspect of the invention may further be provided with a first controller which detects a temperature increase in a predetermined period of time in the measured temperature of each of the battery cells, and which controls the detection by the first detector to be executed when the temperature increase in at least one of the battery cells is equal to, or less than, a predetermined amount of change. Accordingly, a temperature increase in a predetermined period of time in the battery cells measured by the measuring devices that is equal to, or less than, a predetermined amount of change may conceivably indicate that charging or discharging of a large current value is not being performed, or if charging or discharging of a large current value is being performed, that the battery is being sufficiently cooled. In this state, the first controller controls the first detector to detect a temperature abnormality in the secondary battery. Accordingly, it is possible to detect a temperature abnormality in the secondary battery while ignoring cases in which the charge-discharge current of the secondary battery temporarily changes drastically (i.e., cases in which a large difference in temperature between battery cells is temporarily detected).

The temperature abnormality detecting apparatus according to the first aspect of the invention may also be provided with a second controller which detects a temperature increase in a predetermined period of time in the measured temperature of each of the battery cells, and which controls the detection by the first detector to be executed when the temperature increases in all of the battery cells are equal to, or less than, a predetermined amount of change. Accordingly, a temperature increase in a predetermined period of time in the battery cells measured by all of the measuring devices that is equal to, or less than, a predetermined amount of change may conceivably indicate that charging or discharging of a large current value is not being performed, or if charging or discharging of a large current value is being performed, that the battery is being sufficiently cooled. In this state, the second controller controls the first detector to detect a temperature abnormality in the secondary battery. Accordingly, it is possible to detect a temperature abnormality in the secondary battery while ignoring cases in which the charge-discharge current of the secondary battery temporarily changes drastically (i.e., cases in which a large difference in temperature between battery cells is temporarily detected).

In the first aspect of the invention, the first detector detects a temperature abnormality in the secondary battery when a difference between the measured temperature of each of the battery cells is greater than a predetermined value. Accordingly, it can be determined that the temperature of the secondary battery is abnormal, if, for example, when there are two measuring devices the difference between the temperatures measured by those two measuring devices is greater than a predetermined threshold value, or if, when there are three measuring devices, the difference between the maximum value and the minimum value of the temperatures measured by the three measuring devices is greater than a predetermined threshold value.

A second aspect of the invention relates to a temperature abnormality detecting method for detecting a temperature abnormality in a secondary battery made up of a plurality of battery cells. The temperature abnormality detecting method includes the steps of a) measuring temperatures of at least two battery cells from among the plurality of battery cells, b) equalizing the temperatures of the plurality of battery cells, and c) detecting a temperature abnormality in the secondary battery based on the measured temperatures of the battery cells, corresponding to the execution of step a).

According to this aspect of the invention, the battery cells are cooled in step b) so as to equalize their temperatures by blowing cooling air into a case of the secondary battery, for example. In this state, i.e., while step b) is being sufficiently executed, step c) detects a temperature abnormality in the secondary battery based on the temperatures of the battery cells measured in step a). If at this time the difference between the measured temperatures of two or more battery cells is greater than a predetermined value, for example, a temperature abnormality in the secondary battery is detected. Accordingly, a determination regarding a temperature abnormality in the secondary battery is only made in step c) when the temperatures of the battery cells have been sufficiently equalized. Accordingly, it is possible to avoid an abnormality from being detected due to a difference in the cooling efficiency of the battery cells due to, for example, the positional relationship between the battery cells and the cooling fan. It is also possible to avoid an abnormality from being detected due to an increased temperature difference when the cooling fan is not operating. As a result, an abnormality in the temperature of a secondary battery having a cooling device can be accurately detected by a simple method.

The temperature abnormality detecting method in the second aspect of the invention, the temperatures of the plurality of battery cells may be equalized by cooling the plurality of battery cells by supplying a cooling medium thereto in step b) and that the temperature abnormality detecting method further include the step of d) determining whether the secondary battery has been sufficiently cooled by the cooling medium, wherein step c) is executed when it is determined that the secondary battery has been sufficiently cooled in step d). Accordingly, a determination regarding a temperature abnormality in the secondary battery is only made in step c) when the secondary battery has been sufficiently cooled by the cooling medium and the temperatures of the battery cells have been equalized. As a result, it is possible to detect a temperature abnormality in the secondary battery based on, for example, a temperature difference between battery cells when it has determined in step d) that the secondary battery has been sufficiently cool. It is also possible to avoid an abnormality from being detected 1) due to a difference in the cooling efficiency of the battery cells resulting from, for example, the positional relationship between the battery cells and the cooling fan, or 2) due to an increased temperature difference when the cooling fan is not operating.

The temperature abnormality detecting method according to the first aspect of the invention, the step d) may include calculating a cooling time to sufficiently cool the secondary battery based on a temperature difference between the temperatures of the battery cells measured in step a), and a pre-stored relationship between the temperature difference and the cooling time, detecting an execution period of step b), and wherein whether the secondary battery is sufficiently cool is determined based on the calculated cooling time and the detected execution period. With this design, the relationship between the temperature difference and the cooling time is stored beforehand using the fact that the cooling time tends to increase the smaller the temperature difference. The cooling time to sufficiently cool the secondary battery is calculated from the difference between the measured temperatures of the battery cells. When the secondary battery is cooled for a duration equal to, or longer than, this cooling time, the temperatures of the battery cells should be equal. In this state, a temperature abnormality in the secondary battery is able to be detected when the difference between the temperatures of the battery cells is large.

The temperature abnormality detecting method according to the second aspect of the invention may further include the step of e) detecting a temperature increase in a predetermined period of time in the temperature of each of the battery cells measured in step a), and controlling step c) to be executed when the measured temperature increase in at least one of the battery cells is equal to, or less than, a predetermined amount of change. Accordingly, a temperature increase in a predetermined period of time in the battery cells measured in step a) that is equal to, or less than, a predetermined amount of change may conceivably indicate that charging or discharging of a large current value is not being performed, or if charging or discharging of a large current value is being performed, that the battery is being sufficiently cooled. In this state, in step h), detection of a temperature abnormality in the secondary battery in step c) is performed. Accordingly, it is possible to detect a temperature abnormality in the secondary battery while ignoring cases in which the charge-discharge current of the secondary battery temporarily changes drastically (i.e., cases in which a large difference in temperature between battery cells is temporarily detected).

The temperature abnormality detecting method according to the second aspect of the invention may also include the step of f) detecting a temperature increase in a predetermined period of time in the measured temperature of each of the battery cells measured in step a), and controlling step c) to be executed when the temperature increases in all of the battery cells are equal to, or less than, a predetermined amount of change. Accordingly, a temperature increase in a predetermined period of time in the battery cells measured in step a) executed for all of the battery cells that is equal to, or less than, the predetermined amount of change may conceivably indicate that charging or discharging of a large current value is not being performed, or if charging or discharging of a large current value is being performed, that the battery is being sufficiently cooled. In this state, in step i), detection of a temperature abnormality in the secondary battery in step c) is performed. Accordingly, it is possible to detect a temperature abnormality in the secondary battery while ignoring cases in which the charge-discharge current of the secondary battery temporarily changes drastically (i.e., cases in which a large difference in temperature between battery cells is temporarily detected).

In the second aspect of the invention, step c) may also detects a temperature abnormality in the secondary battery when a difference in the temperatures of the battery cells measured in step a) is greater than a predetermined value. Accordingly, it can be determined that the temperature of the secondary battery is abnormal, if, for example, when step a) is executed for at least two battery cells, the difference between a maximum value and a minimum value of the measured temperatures is greater than a predetermined threshold value.

A third aspect of the invention relates to a temperature abnormality detecting apparatus that detects a temperature abnormality in a secondary battery comprising a plurality of battery cells. This temperature abnormality detecting apparatus includes i) measuring means for measuring temperatures of at least two battery cells from among the plurality of battery cells, ii) temperature equalizing means for equalizing the temperatures of the battery cells, and iii) detecting means for detecting a temperature abnormality in the secondary battery based on the temperatures of the battery cells measured by the measuring means, corresponding to operation of the temperature equalizing means.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments. In the description, like parts will be denoted by like reference numerals and referred to by the same nomenclature throughout. Redundant descriptions thereof will be omitted.

Figure 1:
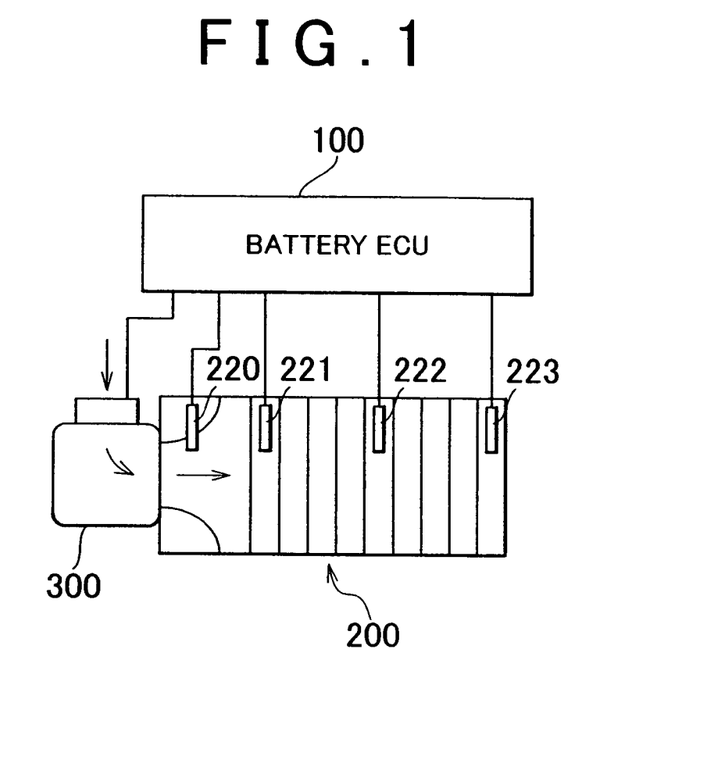
FIG. 1 is a block diagram of a battery cooling system according to one exemplary embodiment of this invention.

FIG. 1 is a block diagram of a battery cooling system according to one exemplary embodiment of the invention. As shown in the drawing, this cooling system includes a battery ECU (Electronic Control Unit) 100, a battery 200, and a cooling fan 300 which blows cooling air toward the battery 200. This cooling fan 300 may also draw the cooling air away from the battery 200.

The battery ECU 100 includes i) a CPU (Central Processing Unit) which executes a program and the like, to be described later, ii) memory for storing the program to be executed by the CPU as well as various threshold values and a map, to be described later, used in the program, iii) a counter for counting the various variables in the program, and iv) an interface for transmitting and receiving signals between a temperature sensor and the cooling fan 300. The CPU, memory, counter, and interface are all connected to one another by an internal bus.

The battery ECU 100 having the foregoing structure is merely one example, and is not limited to this structure. For example, the counter may be inside the CPU and does not have to be connected to the battery ECU 100 by the internal bus.

The battery 200 has a structure in which approximately 30 battery modules, each having approximately six 1.2V or so nickel-metal hydride battery cells connected in series, are stacked in series. The type of battery in this invention, however, is not limited to this nickel-metal hydride battery.

The cooling fan 300 for cooling the battery 200 by drawing up air from inside the vehicle cabin and blowing it toward the battery 200 is connected to the battery 200 via a cooling passage. As shown in FIG. 1, the battery cooling system is also provided with battery temperature sensors 221 to 223 for detecting the temperature of the battery 200 at each battery cell, as well as a battery cooling air temperature sensor 220 for detecting the temperature of the air used to cool the battery 200. Although the drawing shows three of these battery temperature sensors 221 to 223, the invention is not limited to this number.

An air conditioner, for example, is provided on the upstream side of the cooling fan 300 (i.e., on the opposite side of the battery 200). This air conditioner cools or heats the air inside the vehicle cabin. Air inside the vehicle cabin that has been temperature regulated by the air conditioner is supplied to the battery 200 by the cooling fan 300. The temperature of the air regulated by the air conditioner inside the vehicle cabin is detected by the battery cooling air temperature sensor 220.

A temperature sensing element (i.e., thermistor), for example, is used for the battery cooling air temperature sensor 220, as well as for each of the battery temperature sensors 221 to 223.

A map stored in the memory in the battery ECU 100 shown in FIG. 1 will now be described with reference to FIG. 2.

Figure 2:
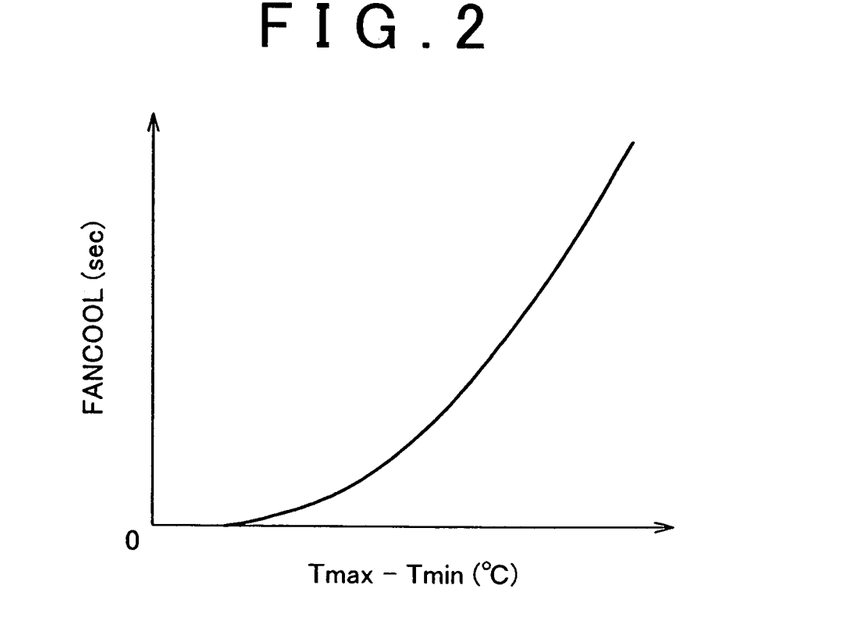
FIG. 2 is a view of a map that is stored in the memory of a battery ECU in FIG. 1.

As shown in FIG. 2, the horizontal axis of the map stored in the memory of the battery ECU 100 indicates the temperature difference between the maximum battery temperature and the minimum battery temperature measured by the battery temperature sensors 221 to 223. The vertical axis of the map represents the cooling fan operating time (FANCOOL). The map is stored such that the cooling fan operating time increases the greater the temperature difference between battery cells at the battery temperature sensors, as shown in FIG. 2.

The map shown in FIG. 2 is used to calculate the cooling fan operating time based on the difference between the temperatures of the battery cells measured by the battery temperature sensors 221 to 223 according to a program, to be described later. It is then determined whether the cooling fan 300 has been operating for a period of time equal to, or longer than, the calculated cooling fan operating time. If the cooling fan 300 has been operating for a period longer than the cooling fan operating time (FANCOOL) shown in FIG. 2, a determination is made as to whether or not there is a temperature abnormality in the battery 200.

Figure 3:
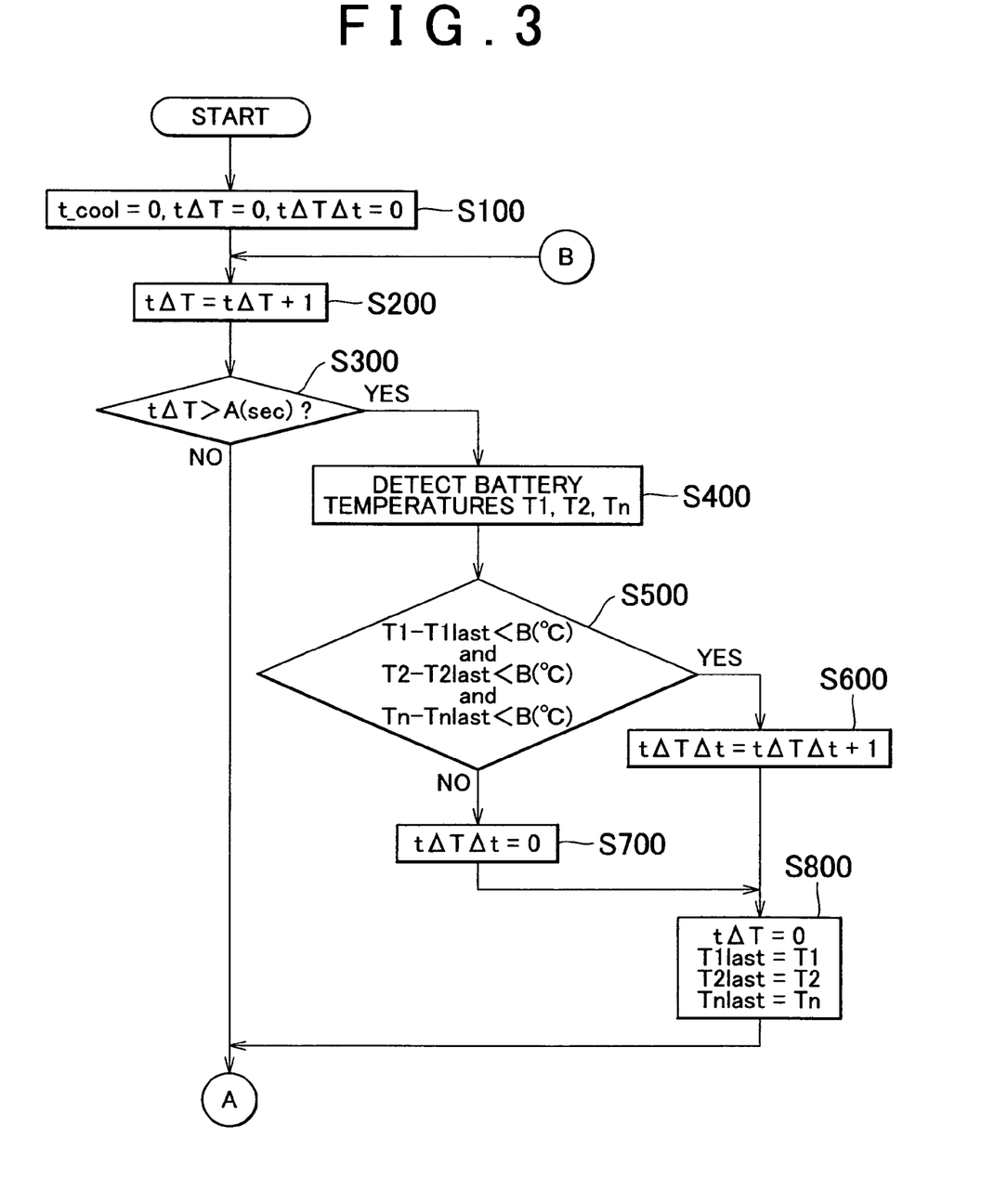
FIG. 3 is part 1 of a flowchart illustrating the control structure of a program executed by the battery ECU in FIG. 1.
Figure 4:
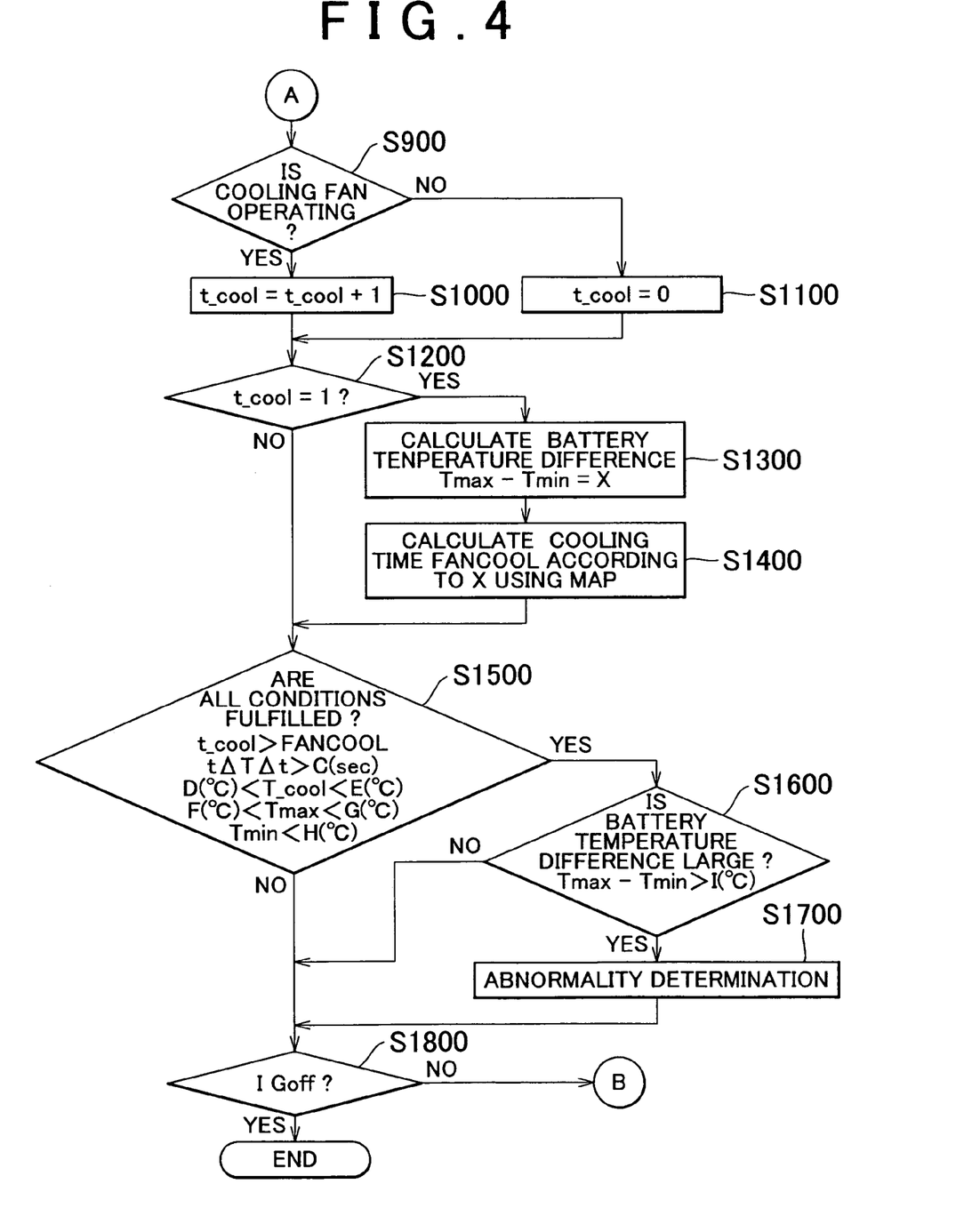
FIG. 4 is part 2 of the flowchart illustrating the control structure of the program executed by the battery ECU in FIG. 1.

The control structure of the program executed by the battery ECU 100 of the battery cooling system according to this exemplary embodiment will now be described with reference to FIGS. 3 and 4.

In step S100, the battery ECU 100 initializes various variables (t_cool=0, tΔT=0, tΔTΔt=0). In step S200 the battery ECU 100 adds 1 to the variable tΔT.

In step S300, the battery ECU 100 determines whether the variable tΔT is larger than a predetermined period of time A (sec). If the variable tΔT is greater than the predetermined period of time A (sec) (i.e., YES in step S300), the routine proceeds on to step S400. If not (i.e., NO in step S300), the routine proceeds on to step S900 in FIG. 4.

In step S400 the battery ECU 100 detects battery temperatures T1, T2, and Tn. At this time, the battery ECU 100 detects the battery temperatures based on temperature signals input from the battery temperature sensors 221 to 223. In the following explanation, n shall equal 3.

In step S500, the battery ECU 100 determines i) whether (Ti−T1last) is less than a predetermined threshold value B (° C.), ii) whether (T2−T2last) is less than the predetermined threshold value B (° C.), and iii) whether (Tn−Tnlast) is less than the predetermined threshold value B (° C.). That is, the battery ECU 100 determines whether the difference between the current temperature and the temperature at the last sampling time measured at the battery temperature sensors 221 to 223 is less than the predetermined value B (° C.) at all of the battery temperature sensors 221 to 223. If i) (T1−T1last) is less than the predetermined threshold value B (° C.), ii) (T2−T2last) is less than the predetermined threshold value B (°C.), and iii) (Tn−Tnlast) is less than the predetermined threshold value B (° C.) (i.e., YES in step S500), the routine proceeds on to step S600. If not (i.e., NO in step S500), the routine proceeds on to step S700. The threshold value may also be set differently for each battery temperature sensor.

In step S600, the battery ECU 100 adds 1 to the variable tΔTΔt. The routine then proceeds on to step S800.

In step S700, the battery ECU 100 substitutes 0 for the tΔTΔt. The routine then proceeds on to step S800.

In step S800, the battery ECU 100 substitutes 0 for the variable tΔT, T1 for T1last, T2 for T2last, and Tn for Tnlast. The routine then proceeds on to step S900 in FIG. 4.

In step S900, the battery ECU 100 determines whether the cooling fan is operating. This determination is made based on an operating state signal sent input from the cooling fan 300. If the cooling fan 300 is operating (i.e., YES in step S900), the routine proceeds on to step S1000. If not (i.e., NO in step S900), the routine proceeds on to step S1100.

In step S1000, the battery ECU 100 adds 1 to the variable t_cool. In step S1100, the battery ECU 100 substitutes 0 for t_cool. After steps S1000 and S1100, the routine proceeds on to step S1200.

In step S1200, the battery ECU 100 determines whether the variable t_cool is 1. If so (i.e., YES in step S1200), the routine proceeds on to step S1300. If not (i.e., NO in step S1200), the routine proceeds on to step S1500.

In step S1300, the battery ECU 100 calculates the difference in the battery temperatures. At this time, the difference between Tmax, which is the maximum value of the battery temperatures measured by the battery temperature sensors 221 to 223, and a minimum value Tmin of the battery temperatures is calculated as a battery temperature difference X. In step S1400, the battery ECU 100 calculates the cooling time FANCOOL according to that difference X using the map shown in FIG. 2. The routine then proceeds on to step S1500.

In step S1500, the battery ECU 100 determines i) whether the variable t_cool is greater than the cooling time FANCOOL, ii) whether the variable tΔTΔt is greater than a predetermined threshold value C (sec), iii) whether a battery cooling temperature T_cool is between predetermined threshold values D (° C.) and E (° C.), iv) whether the maximum value Tmax of the battery temperatures is between predetermined threshold values F (° C.) and G (° C.), and v) whether the minimum value Tmin of the battery temperatures is less than a predetermined threshold value H (° C.). If all of these conditions are satisfied (i.e., YES in step S1500), the routine proceeds on to step S1600. If not (i.e., NO in step S1500), the routine proceeds on to step S1800.

In step S1600, the battery ECU 100 determines whether the difference in the battery temperatures is large. At this time the battery ECU 100 determines whether the difference between the maximum value Tmax of the battery temperatures measured by the battery temperature sensors 221 to 223 and the minimum value Tmin of the battery temperatures measured by the battery temperature sensors 221 to 223 is greater than a predetermined threshold value I (° C.). If the battery temperature difference is greater than the predetermined threshold value I (° C.) (i.e., YES in step S1600), the routine proceeds on to step S1700. If not (i.e., NO in step S1600), the routine proceeds on to step S1800.

In step S1700, the battery ECU 100 determines that the temperature of the battery 200 is abnormal. Then the routine proceeds on to step S1800.

In step S1800, the battery ECU 100 determines whether an ignition switch, not shown, has been turned off based on a signal from the ignition switch. If the ignition switch has been turned off (i.e., YES in step S1800), the routine ends. If not (i.e., NO in step S1800), the routine returns to step S200 in FIG. 3.

Operation of the battery cooling system according to this exemplary embodiment will now be described based on the foregoing structure and flowchart.

When the ignition switch is turned on, the various variables are initialized (step S100). If the variable tΔT is equal to, or greater than, the predetermined period of time A (sec) (i.e., YES in step S300), the battery temperatures are detected as battery temperatures T1, T2, and Tn by the battery temperature sensors 221 to 223 (step S400). If the difference between the current battery temperatures detected in step S400 and the battery temperatures measured at the last sampling time is less than the predetermined value B (° C.) for each of the battery temperature sensors 221 to 223 (i.e., YES in step S500), 1 is added to the variable tΔTΔt in step S600. That is, the value tΔTΔt gradually increases only when, within a predetermined period of time, the increase in the battery temperature at each battery sensor 221 to 223 is small.

In order to calculate the increase in the battery temperature within the predetermined period of time at the next sampling time, T1 is substituted for T1last, T2 for T2last, and Tn for Tnlast (step S800).

When the cooling fan 300 is operating (i.e., YES in step S900), 1 is added to the variable t_cool. When t_cool is 1 (i.e., YES is step S1200), the battery temperature difference X is calculated (step S1300). The cooling time FANCOOL is calculated using the map shown in FIG. 2 in accordance with the battery temperature difference X (step S1400). The cooling time FANCOOL corresponding to the battery temperature difference X indicates the cooling time of the cooling fan 300 necessary to limit the battery temperature difference measured by the battery temperature sensors 221 to 223 to within the threshold value I (° C.).

After repeating these kinds of steps, it is determined whether all of the following conditions have been satisfied (step S1500). These conditions are: 1) that the variable t_cool be greater than FANCOOL (i.e., that a sufficient amount of cooling time have passed), 2) that the variable tΔTΔt be greater than the predetermined threshold C (sec) (i.e., that the period of time during which the temperature increases, within a predetermined period of time, of all of the battery temperature sensors are less than the threshold B (° C.) have continued uninterrupted for longer than the period of time C (sec), 3) that the battery cooling air temperature T_cool detected by the battery cooling air temperature sensor 220 be between the predetermined thresholds D (° C.) and E (° C.) (i.e., that the battery cooling air temperature not be remarkably high or low), 4) that the maximum value Tmax of the battery temperatures measured by the battery temperature sensors 221 to 223 be between the predetermined threshold values F (° C.) and G (° C.), and 5) that the minimum value Tmin of the battery temperatures measured by the battery temperature sensors 221 to 223 be lower than the predetermined threshold value H (° C.). When all of these conditions are satisfied (i.e., YES in step S1500), it is determined whether a temperature abnormality has occurred in the battery 200.

If the difference in the battery temperatures is large (i.e., YES in step S1600), it is determined that the temperature of the battery 200 is abnormal (step S1700). If at this time the difference between the Tmax, which is the maximum value of the battery temperatures measured by the battery temperature sensors 221 to 223, and the Tmin, which is the minimum value of the battery temperatures measured by the battery temperature sensors 221 to 223, is greater than the predetermined threshold I (° C.), it is determined that the temperature of the battery 200 is abnormal.

Thus, in the cooling system according to this exemplary embodiment, the battery temperature is measured for each battery cell in a battery in which a plurality of battery cells are connected together. The temperature increase, within a predetermined period of time, in each battery temperature sensor is detected, and the temperature of the battery is determined to be abnormal only when and the temperature increase at each battery sensor continues to be less than a predetermined threshold value for longer than a predetermined period of time.

Further, it is determined whether the temperature of the battery is abnormal only when, in addition to the foregoing conditions, the fan for cooling the battery has been operating continually for a cooling period sufficient to eliminate the battery temperature difference. Further, it is determined whether the temperature of the battery is abnormal only when all of the following conditions have been satisfied: 1) the temperature of the cooling air for cooling the battery is within a predetermined range, 2) the maximum value of the battery temperature sensors is within a predetermined range, and 3) the minimum value of the battery temperatures measured by the battery temperature sensors is less than a predetermined threshold value.

As a result, the cooling air is blown into the battery pack by the cooling fan, thus cooling the battery cells and making the temperature of the battery cells equal. After this state has been maintained for a predetermined period of time (a period of time obtained by the map), the determination regarding a temperature abnormality of the battery is made based on the difference between the maximum value and the minimum value of the battery temperatures detected by the battery temperature sensors.

Also at this time, the temperature increase of each battery sensor during the predetermined period of time is detected and it is determined that there is a temperature abnormality only when the amount of change of the temperature increase is less than a predetermined threshold value. As a result, a temperature abnormality in a battery cell can be detected without being effected by a temporary change in the battery temperature due to sudden charging or discharging of the battery.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A temperature abnormality detecting apparatus that detects a temperature abnormality in a secondary battery having a plurality of battery cells, comprising:
   a measuring device that measures temperatures of at least two battery cells from among the plurality of battery cells;
   a temperature equalizing device that equalizes the temperatures of the plurality of battery cells by cooling the plurality of battery cells by supplying a cooling medium thereto;
   a determining device which determines whether the secondary battery has been sufficiently cooled by the cooling medium, including a calculating device that calculates a cooling time to sufficiently cool the secondary battery by applying a temperature difference between a maximum temperature of the temperatures of the battery cells measured by the measuring device to a pre-stored parabolic relationship between the temperature difference and the cooling time;
   a first detector that detects an operating time of the temperature equalizing device;

a second detector that detects a temperature abnormality in the secondary battery based on the measured temperatures of the battery cells and determines whether there is the temperature abnormality in the secondary battery after the temperature equalizing device has been operated only for the calculated cooling time; and a controller which detects a temperature increase in a predetermined period of time in the measured temperature of each of the battery cells, wherein the determining device determines that the secondary battery has been sufficiently cooled when the detected operating time is equal to the calculated cooling time and when the temperature increase in at least one of the battery cells is equal to, or less than, a predetermined amount of change.

2. The temperature abnormality detecting apparatus according to claim 1, wherein the determining device determines that the secondary battery has been sufficiently cooled when the detected operating time is equal to the calculated cooling time and when the temperature increases in all of the battery cells are equal to, or less than, a predetermined amount of change.

3. The temperature abnormality detecting apparatus according to claim 1, wherein the second detector detects a temperature abnormality in the secondary battery when a difference between the measured temperature of each of the battery cells is greater than a predetermined value.

4. A temperature abnormality detecting method for detecting a temperature abnormality in a secondary battery having a plurality of battery cells, comprising the steps of:

a) measuring temperatures of at least two battery cells from among the plurality of battery cells;

b) equalizing the temperatures of the plurality of battery cells by cooling the plurality of battery cells by supplying a cooling medium thereto;

c) determining whether the secondary battery has been sufficiently cooled by the cooling medium, wherein step d) is executed when it is determined that the secondary battery has been sufficiently cooled by the cooling medium in step d), including calculating a cooling time to sufficiently cool the secondary battery based on a temperature difference between the temperatures of the battery cells measured in step a), and a pre-stored relationship between the temperature difference and the cooling time, and detecting an execution period of step b);

d) detecting a temperature abnormality in the secondary battery by applying a temperature difference between a maximum temperature of the temperatures of the battery cells measured by the measuring device to a pre-stored parabolic relationship between the temperature difference and the cooling time, determining whether there is the temperature abnormality in the secondary battery after step execution of step c); and e) detecting a temperature increase in a predetermined period of time in the temperature of each of the battery cells measured in step a), wherein whether the secondary battery has been sufficiently cooled is determined when the detected execution period is equal to the calculated cooling time and when the measured temperature increase in at least one of the battery cells is equal to, or less than, a predetermined amount of change.

5. The temperature abnormality detecting method according to claim 4, wherein whether the secondary battery has been sufficiently cooled is determined when the detected execution period is equal to the calculated cooling time and when the temperature increases in all of the battery cells are equal to, or less than, a predetermined amount of change.

6. The temperature abnormality detecting method according to claim 4, wherein step d) detects a temperature abnormality in the secondary battery when a difference in the temperatures of the battery cells measured in step a) is greater than a predetermined value.

7. A temperature abnormality detecting apparatus that detects a temperature abnormality in a secondary battery having a plurality of battery cells, comprising:

measuring means for measuring temperatures of at least two battery cells from among the plurality of battery cells;

temperature equalizing means for equalizing the temperatures of the plurality of the battery cells by cooling the plurality of battery cells by supplying a cooling medium thereto;

determining means which determines whether the secondary battery has been sufficiently cooled by the cooling medium, including calculating means that calculates a cooling time to sufficiently cool the secondary battery by applying a temperature difference between a maximum temperature of the temperatures of the battery cells measured by the measuring device to a pre-stored parabolic relationship between the temperature difference and the cooling time;

first detecting means for detecting an operating time of the temperature equalizing means; and second detecting means for detecting a temperature abnormality in the secondary battery based on the temperatures of the battery cells and for determining whether there is the temperature abnormality in the secondary battery after the temperature equalizing device has been operated only for the calculated cooling time, controlling means which detects a temperature increase in a predetermined period of time in the measured temperature of each of the battery cells, and wherein the determining means determines that the secondary battery has been sufficiently cooled when the detected operating time is equal to the calculated cooling time and when the temperature increase in at least one of the battery cells is equal to, or less than, a predetermined amount of change.

8. The temperature abnormality detecting apparatus according to claim 1, wherein the temperature equalizing means is a single and common cooling fan.

9. The temperature abnormality detecting method according to claim 4, wherein the temperature equalizing means is a single and common cooling fan.

10. The temperature abnormality detecting apparatus according to claim 7, wherein the temperature equalizing means is a single and common cooling fan.

* * * * *

UNITED STATES PATENT AND TRADEMARK OFFICE
CERTIFICATE OF CORRECTION

PATENT NO. : 7,492,129 B2
APPLICATION NO. : 10/864510
DATED : February 17, 2009
INVENTOR(S) : Koji Aridome It is certified that error appears in the above-identified patent and that said Letters Patent is hereby corrected as shown below:

| Column | Line | |
|---|---|---|
| 1 | 57 | Change "do" to --due--. |
| 6 | 44 | Change "cool." to --cooled.--. |
| 7 | 18 | Change "step h)" to --step d)--. |
| 7 | 48 | Change "detects" to --detect--. |
| 14 | 55 | Change "means" to --device--. |
| 15 | 57 | Change "the temperature equalizing means" to --the cooling medium--. |

Signed and Sealed this

Ninth Day of February, 2010

David J. Kappos
*Director of the United States Patent and Trademark Office*